(12) United States Patent
Winsor

(10) Patent No.: US 9,534,534 B2
(45) Date of Patent: Jan. 3, 2017

(54) POWER SYSTEM INCLUDING A VARIABLE GEOMETRY TURBOCOMPOUND TURBINE

(71) Applicant: DEERE & COMPANY, Moline, IL (US)

(72) Inventor: Richard E Winsor, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 510 days.

(21) Appl. No.: 14/011,800

(22) Filed: Aug. 28, 2013

(65) Prior Publication Data

US 2015/0063988 A1 Mar. 5, 2015

(51) Int. Cl.

| F01N 5/04 | (2006.01) |
|---|---|
| F02B 37/00 | (2006.01) |
| F02B 37/24 | (2006.01) |
| F02B 41/10 | (2006.01) |
| F02B 37/013 | (2006.01) |
| F02D 41/00 | (2006.01) |

(52) U.S. Cl.
CPC ........... *F02B 37/004* (2013.01); *F02B 37/013* (2013.01); *F02B 37/24* (2013.01); *F02B 41/10* (2013.01); *F02D 41/0007* (2013.01); *Y02T 10/144* (2013.01); *Y02T 10/163* (2013.01)

(58) Field of Classification Search
CPC ....... F02B 37/004; F02B 37/013; F02B 37/24; F02B 41/10; F02D 41/0007; B67B 3/10
USPC .......................................... 60/280, 612, 602
See application file for complete search history.

(56) References Cited

U.S. PATENT DOCUMENTS

| 4,718,235 A | 1/1988 | Kawamura | |
|---|---|---|---|
| 5,142,868 A | 9/1992 | Woon et al. | |
| 6,378,308 B1 * | 4/2002 | Pfluger | F01N 13/107 123/559.1 |
| 6,625,986 B2 | 9/2003 | Mazaud et al. | |
| 6,681,575 B2 | 1/2004 | Dellora et al. | |
| 6,694,736 B2 * | 2/2004 | Pfluger | F01N 13/107 123/559.1 |
| 7,644,585 B2 * | 1/2010 | Haugen | F01D 9/026 60/602 |
| 7,886,522 B2 * | 2/2011 | Kammel | F01N 3/30 180/65.21 |
| 8,333,073 B2 | 12/2012 | Giselmo et al. | |

(Continued)

FOREIGN PATENT DOCUMENTS

| DE | 102004061030 A1 | 6/2006 |
|---|---|---|
| DE | 102004062492 A1 | 7/2006 |

(Continued)

OTHER PUBLICATIONS

European Search Report issued in counterpart application No. 14181945.8, dated Apr. 10, 2015 (5 pages).

*Primary Examiner* — Thomas Denion
*Assistant Examiner* — Diem Tran

(57) ABSTRACT

Disclosed is a power system having a turbocharger, a VG turbocompound turbine, and a controller. The turbocharger has a turbine coupled to a compressor, and the VG turbocompound turbine positioned downstream of the turbine relative to a direction of a flow of an exhaust gas flowing through the turbine and the VG turbocompound turbine. The controller sends a signal to adjust a geometry of the VG turbocompound turbine so as to adjust a boost level being provided by the turbocharger.

17 Claims, 3 Drawing Sheets

(56) References Cited

U.S. PATENT DOCUMENTS

| | | | |
|---|---|---|---|
| 8,671,682 B2 * | 3/2014 | Parlow | F02B 37/00 |
| | | | 60/602 |
| 2010/0083656 A1 | 4/2010 | Parlow et al. | |
| 2011/0094485 A1 | 4/2011 | Vuk et al. | |
| 2012/0227397 A1 | 9/2012 | Willi et al. | |

FOREIGN PATENT DOCUMENTS

| | | |
|---|---|---|
| EP | 1195502 A1 | 4/2002 |
| EP | 1302644 B1 | 10/2002 |
| EP | 1954929 B1 | 2/2012 |
| JP | H08240156 A | 9/1996 |
| WO | 2010092945 A1 | 8/2010 |

* cited by examiner

POWER SYSTEM INCLUDING A VARIABLE GEOMETRY TURBOCOMPOUND TURBINE

FIELD OF THE DISCLOSURE

The present disclosure relates to a power system comprising a variable geometry (VG) turbocompound turbine.

BACKGROUND OF THE DISCLOSURE

A standard turbocompound engine includes a turbocharged diesel engine with a turbocompound turbine placed downstream of the turbine of the turbocharger. In some known examples, the turbocompound turbine recovers exhaust energy and transmits power to the engine output shaft, to which the turbocompound turbine is coupled by a transmission. While the power turbine is useful in providing additional output shaft power, it has been found that the power turbine restricts air flow to unacceptable levels under certain operating conditions, such as at high altitudes, during low speed and high load conditions, and during transient load conditions. The insufficient air flow results in poor performance, high exhaust temperatures, and increased emissions.

SUMMARY OF THE DISCLOSURE

Disclosed is a power system having a turbocharger, a VG turbocompound turbine, and a controller. The turbocharger has a turbine coupled to a compressor, and the VG turbocompound turbine positioned downstream of the turbine relative to a direction of a flow of an exhaust gas flowing through the turbine and the VG turbocompound turbine. The controller sends a signal to adjust a geometry of the VG turbocompound turbine so as to adjust a boost level being provided by the turbocharger.

BRIEF DESCRIPTION OF THE DRAWINGS

The detailed description of the drawings refers to the accompanying figures in which.

DETAILED DESCRIPTION OF THE DRAWINGS

Figure 1:
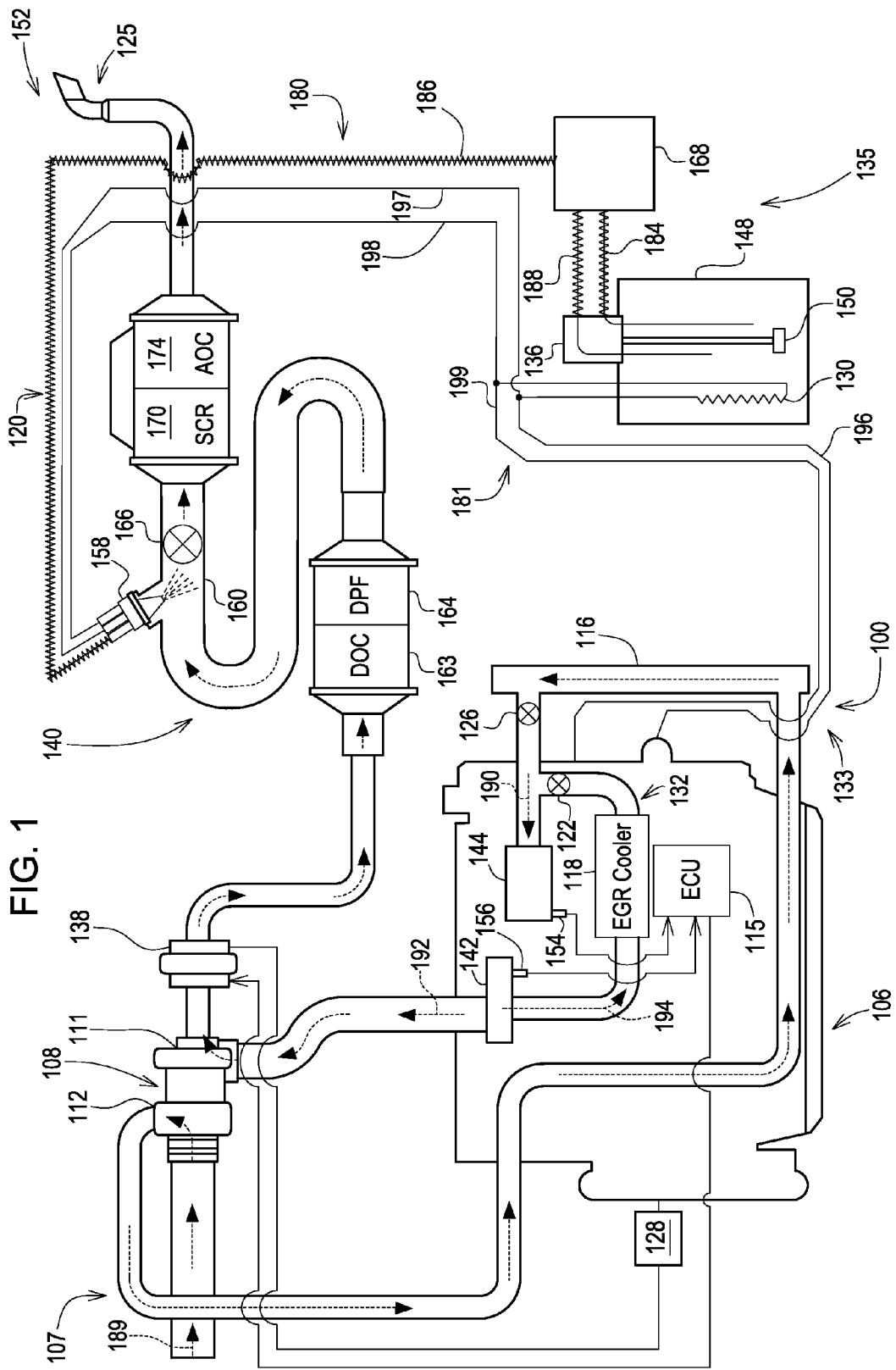
FIG. 1 is a schematic illustration of a first power system having a VG turbocompound turbine.

Referring to FIG. 1, there is shown a schematic illustration of a first power system 100 for providing power to a variety of machines, including on-highway trucks, construction vehicles, marine vessels, stationary generators, automobiles, agricultural vehicles, and recreation vehicles. The first power system 100 includes an engine 106 that may be any kind that produces an exhaust gas, the exhaust gas being indicated by directional arrow 192. The engine 106 may be an internal combustion engine, such as a gasoline engine, a diesel engine, a gaseous fuel burning engine (e.g., natural gas), or any other exhaust gas producing engine. The engine 106 may be of any size, with any number cylinders, and in any configuration (e.g., "V," inline, and radial). The engine 106 may include various sensors, such as temperature sensors, pressure sensors, and mass flow sensors—some of which are shown in FIG. 1.

The first power system 100 may comprise an intake system 107 that includes components for introducing a fresh intake gas, as indicated by directional arrow 189, into the engine 106. Among other things, the intake system 107 may include an intake manifold 144 in communication with the cylinders, a compressor 112, a charge air cooler 116, and an air throttle actuator 126.

The compressor 112 may be a fixed geometry compressor, a variable geometry compressor, or any other type of compressor that is capable of receiving the fresh intake gas from upstream of the compressor 112. The compressor 112 compresses the fresh intake gas to an elevated pressure level. As shown, the charge air cooler 116 is positioned downstream of the compressor 112, and it cools the fresh intake gas.

The air throttle actuator 126 may be positioned downstream of the charge air cooler 116, and it may be, for example, a flap type valve controlled by an electronic control unit (ECU) 115 to regulate the air-fuel ratio. The air throttle actuator 126 is open during normal operation and when the engine 106 is off. However, in order to raise the exhaust temperature prior to, and during, active exhaust filter regeneration, the ECU 115 may progressively close the air throttle actuator 126. This creates a restriction, causing the exhaust temperature to increase. The ECU 115 receives position feedback from an internal sensor within the air throttle actuator 126.

Further, the first power system 100 includes an exhaust system 140, having components for directing exhaust gas from the engine 106 to the atmosphere. The exhaust system 140 may include an exhaust manifold 142 in fluid communication with the cylinders. During an exhaust stroke, at least one exhaust valve (not shown) opens, allowing the exhaust gas to flow through the exhaust manifold 142 and a turbine 111. The pressure and volume of the exhaust gas drives the turbine 111, allowing it to drive the compressor 112 via a shaft (not shown). The combination of the compressor 112, the shaft, and the turbine 111 is known as a turbocharger 108.

The first power system 100 may also have an EGR system 132 for receiving a recirculated portion of the exhaust gas, as indicated by directional arrow 194. The intake gas is indicated by directional arrow 190, and it is a combination of the fresh intake gas and the recirculated portion of the exhaust gas. The EGR system 132 has an EGR valve 122 and an EGR mixer (not shown). The EGR valve 122 may be a vacuum controlled valve, allowing a specific amount of the recirculated portion of the exhaust gas back into the intake manifold 144. Although the EGR valve 122 is illustrated as being downstream of EGR cooler 118, it could also be positioned upstream thereof.

As noted above, the EGR mixer mixes the recirculated portion of the exhaust gas and the fresh intake gas, resulting in the formation of the intake gas. The recirculated exhaust gas travels in pulses correlating to the exhaust strokes of the cylinders (not shown) of the engine 106. So, if the engine 106 has, for example, four cylinders, then the recirculated exhaust gas travels in one pulse per every 180° of crank rotation. The fresh intake gas also travels in pulses, but these pulses correlate to, for example, the operation of the turbocharger 108, and the intake valves (not shown). This results in a flow of the pulses of the fresh intake gas at unique times and frequencies, relative to the pulses of the recirculated exhaust gas. As a result of all of this, the recirculated exhaust gas and fresh intake gas turbulently mix in the EGR mixer.

The first power system 100 includes a turbocharger 108; a VG turbocompound turbine 138; and a controller, shown in the form of ECU 115. The turbocharger 108 has a turbine 111 coupled to a compressor 112, and the VG turbocompound turbine 138 positioned downstream of the turbine 111 relative to a direction of the flow of an exhaust gas flowing through the turbine 111 and the VG turbocompound turbine 138. The ECU 115 sends a signal to adjust a geometry of the VG turbocompound turbine 138 so as to adjust a boost level being provided by the turbocharger 108. A pressure sensor 154 disposed in the intake manifold 144 and a pressure sensor 156 disposed in the exhaust manifold 142 cooperate with the ECU 115, so as to monitor the pressure difference between the intake manifold 144 and the exhaust manifold 142. If the pressure difference therebetween becomes too great, then one of the exhaust valves may be lifted off of its seat during the intake stroke, thereby admitting exhaust gas back into the cylinder. To adjust the geometry of the VG turbocompound turbine 138, the VG turbocompound turbine 138 may have pivotable vanes or a slideable housing, for example.

The first power system 100 includes a crankshaft (not shown) and a transmission 128 positioned between the VG turbocompound turbine 138 and the crankshaft. The VG turbocompound turbine 138 recovers energy from the exhaust gas that would otherwise be expelled into the environment surrounding the first power system 100, and it reroutes the energy back to the crankshaft via the transmission 128 (e.g., a gear transmission or a hydrostatic transmission). The crankshaft benefits from the constant extra drive coming from the turbocompounding process. In contrast, other embodiments of the first power system 100 may include power electronics (not shown) in communication with the VG turbocompound turbine 138. In such embodiments, the power electronics may provide electrical energy to a storage device (not shown) for temporary storage of electrical energy being created by the VG turbocompound turbine 138. The electrical energy may be supplied to an electric motor (not shown) connected to the crank shaft (not shown) of the engine 106 or to any other kind of electrical device.

In contrast, other embodiments of the first power system 100 may include an electrical generator (not shown) driven by the VG turbocompound turbine 138. In such cases, the electrical generator may provide electrical energy to a storage device (not shown) for temporary storage of the electrical energy. The electrical energy may also be supplied to an electric motor (not shown) connected to the crankshaft (not shown) of the engine 106 or to any other electrical device.

In a first illustrative operating mode of the first power system 100, the geometry adjustment of the VG turbocompound turbine 138 increases the boost level being provided by the turbocharger 108 to an increased desired boost level for meeting an increased demand of the first power system 100. In this mode, the geometry adjustment increases an effective aspect ratio of the VG turbocompound turbine 138. Further, the exhaust gas does not bypass the VG turbocompound turbine 138, resulting in an arrangement that is more efficient across a variety of operating ranges than would otherwise be possible (e.g., wastegate turbocompound).

The first illustrative operating mode of the first power system 100 may become necessary when accelerating the turbocharger 108 due to a load increase on the engine 106 to a desired boost level, wherein the VG turbocompound turbine 138 would be adjusted for raising the work performed by the turbine 111. Then, for example, once the desired boost level is reached, then the effective aspect ratio would be adjusted so as to maintain the desired boost. By controlling the VG turbocompound turbine 138, higher power, better fuel consumption, lower particulate emissions, and other advantages may be achieved.

The first illustrative operating mode of the first power system 100 may be particularly useful at, for example, high altitudes. For example, at high altitudes, the work extraction of the VG turbocompound turbine 138 may be greater than desired, and a pressure of the intake manifold 144 may be reduced, given that the ambient air is less dense. This results in poor airflow and higher exhaust temperatures. In this condition, the ECU 115 increases the effective ratio of the VG turbocompound turbine 138 based on, for example, speed or pressure sensors on the engine 106. As the effective ratio increases, the backpressure on the turbocharger 108 decreases, allowing more work to be done by the turbine 111, resulting in higher air flow and lower exhaust temperatures. Higher power can also be achieved as a result of the increased air flow.

In a second illustrative operating mode of the first power system 100, the geometry adjustment of the VG turbocompound turbine 138 increases the boost level being provided by the turbocharger 108 to an increased desired boost level for increasing a speed of the turbocharger 108 so as to provide an improved transient response thereof. In this mode, the geometry adjustment increases an effective aspect ratio of the VG turbocompound turbine 138. And further, the exhaust gas does not bypass the VG turbocompound turbine 138, resulting in an arrangement that is more efficient across a variety of operating ranges than would otherwise be possible (e.g., wastegate turbocompound).

In a third illustrative operating mode of the first power system 100, the geometry adjustment of the VG turbocompound turbine 138 decreases the boost level provided by the turbocharger 108 to a decreased desired boost level for meeting a decreased demand of the first power system 100. In this mode, the geometry adjustment decreases an effective aspect ratio of the VG turbocompound turbine 138. Additionally, the exhaust gas does not bypass the VG turbocompound turbine 138, resulting in an arrangement that is more efficient across a variety of operating ranges than would otherwise be possible (e.g., wastegate turbocompound).

The third illustrative operating mode of may become necessary when decelerating the turbocharger 108 due to a load decrease on the engine 106, wherein the VG turbocompound turbine 138 would be adjusted for lowering the work performed by the turbine 111. Then, for example, once the desired boost is reached, then the effective aspect ratio would adjusted so as to maintain the desired boost.

In a fourth illustrative operating mode of the first power system 100, the geometry adjustment of the VG turbocompound turbine 138 decreases the boost level provided by the turbocharger 108 to a decreased desired boost level for preventing the turbocharger 108 from overspeeding. In this mode, the geometry adjustment decreases an effective aspect ratio of the VG turbocompound turbine 138. And further, the exhaust gas does not bypass the VG turbocompound turbine 138.

As further shown, the exhaust system 140 includes an aftertreatment system 120, and at least some of the exhaust gas passes therethrough. The aftertreatment system 120 removes various chemical compounds and particulate emissions present in the exhaust gas received from the engine 106. After being treated by the aftertreatment system 120, the exhaust gas is expelled into the atmosphere via a tailpipe 125.

The ECU 115 may have four primary functions: (1) converting analog sensor inputs to digital outputs, (2) performing mathematical computations for all fuel and other systems, (3) performing self diagnostics, and (4) storing information. The ECU 115 may, in response to the $NO_x$ signal, control a combustion temperature of the engine 106 and/or the amount of a reductant injected into the exhaust gas.

The aftertreatment system 120 is shown having a diesel oxidation catalyst (DOC) 163, a diesel particulate filter (DPF) 164, and a selective catalytic reduction (SCR) system 152, though the need for such components depends on the particular size and application of the first power system 100. The SCR system 152 has a reductant delivery system 135, an SCR catalyst 170, and an ammonia oxidation catalyst AOC 174. The exhaust gas may flow through the DOC 163, the DPF 164, the SCR catalyst 170, and the AOC 174, and is then, as just mentioned, expel into the atmosphere via the tailpipe 125. Exhaust gas that is treated in the aftertreatment system 120 and released into the atmosphere contains significantly fewer pollutants (e.g., PM, $NO_x$, and hydrocarbons) than an untreated exhaust gas.

The DOC 163 may be configured in a variety of ways and contain catalyst materials useful in collecting, absorbing, adsorbing, and/or converting hydrocarbons, carbon monoxide, and/or oxides of nitrogen contained in the exhaust gas. Such catalyst materials may include, for example, aluminum, platinum, palladium, rhodium, barium, cerium, and/or alkali metals, alkaline-earth metals, rare-earth metals, or combinations thereof. The DOC 163 may include, for example, a ceramic substrate, a metallic mesh, foam, or any other porous material known in the art, and the catalyst materials may be located on, for example, a substrate of the DOC 163. The DOC(s) may also oxidize NO contained in the exhaust gas, thereby converting it to $NO_2$ upstream of the SCR catalyst 170.

The DPF 164 may be any of various particulate filters known in the art that are capable of reducing PM concentrations (e.g., soot and ash) in the exhaust gas, so as to meet requisite emission standards. Any structure capable of removing PM from the exhaust gas of the engine 106 may be used. For example, the DPF 164 may include a wall-flow ceramic substrate having a honeycomb cross-section constructed of cordierite, silicon carbide, or other suitable material to remove the PM. The DPF 164 may be electrically coupled to a controller, such as the ECU 115, that controls various characteristics of the DPF 164.

If the DPF 164 were used alone, it would initially help in meeting the emission requirements, but would quickly fill up with soot and need to be replaced. Therefore, the DPF 164 is combined with the DOC 163, which helps extend the life of the DPF 164 through the process of regeneration. The ECU 115 may measure the PM build up, also known as filter loading, in the DPF 164, using a combination of algorithms and sensors. When filter loading occurs, the ECU 115 manages the initiation and duration of the regeneration process.

Moreover, the reductant delivery system 135 may include a reductant tank 148 for storing the reductant. One example of a reductant is a solution having 32.5% high purity urea and 67.5% deionized water (e.g., DEF), which decomposes as it travels through a decomposition tube 160 to produce ammonia. Such a reductant may begin to freeze at approximately 12 deg F. (−11 deg C.). If the reductant freezes when a machine is shut down, then the reductant may need to be thawed before the SCR system 152 can function.

The reductant delivery system 135 may include a reductant header 136 mounted to the reductant tank 148, the reductant header 136 further including, in some embodiments, a level sensor 150 for measuring a quantity of the reductant in the reductant tank 148. The level sensor 150 may include a float for floating at a liquid/air surface interface of reductant included within the reductant tank 148. Other implementations of the level sensor 150 are possible, and may include, for example, one or more of the following: (1) using one or more ultrasonic sensors, (2) using one or more optical liquid-surface measurement sensors, (3) using one or more pressure sensors disposed within the reductant tank 148, and (4) using one or more capacitance sensors.

In the illustrated embodiment, the reductant header 136 includes a tank heating element 130 that receives coolant from the engine 106. The first power system 100 includes a cooling system 133 having a coolant supply passage 180 and a coolant return passage 181. The cooling system 133 may be an opened system or a closed system, depending on the specific application, while the coolant may be any form of engine coolant, including fresh water, sea water, an anti-freeze mixture, and the like.

A first segment 196 of the coolant supply passage 180 is positioned fluidly, between the engine 106 and the tank heating element 130, for supplying coolant to the tank heating element 130. The coolant circulates, through the tank heating element 130, so as to warm the reductant in the reductant tank 148, therefore reducing the risk that the reductant freezes therein and/or thawing the reductant upon startup. In an alternative embodiment, the tank heating element 130 may, instead, be an electrically resistive heating element. A second segment 197 of the coolant supply passage 180 is positioned fluidly between the tank heating element 130 and a reductant delivery mechanism 158 for supplying coolant thereto. The coolant heats the reductant delivery mechanism 158, reducing the risk that reductant freezes therein.

A first segment 198 of the coolant return passage 181 is positioned between the reductant delivery mechanism 158 and the tank heating element 130, and a second segment 199 of the coolant return passage 181 is positioned between the engine 106 and the tank heating element 130. The first segment 198 and the second segment 199 return the coolant to the engine 106.

The decomposition tube 160 may be positioned downstream of the reductant delivery mechanism 158 but upstream of the SCR catalyst 170. The reductant delivery mechanism 158 may be, for example, an injector that is selectively controllable to inject reductant directly into the exhaust gas. As shown, the SCR system 152 may include a reductant mixer 166 that is positioned upstream of the SCR catalyst 170 and downstream of the reductant delivery mechanism 158.

The reductant delivery system 135 may additionally include a reductant pressure source (not shown) and a reductant extraction passage 184. The extraction passage 184 may be coupled fluidly to the reductant tank 148 and the reductant pressure source therebetween. Although the extraction passage 184 is shown extending into the reductant tank 148, in other embodiments, the extraction passage 184 may be coupled to an extraction tube via the reductant header 136. The reductant delivery system 135 may further include a reductant supply module 168, such as a Bosch reductant supply module (e.g., the Bosch Denoxtronic 2.2— Urea Dosing System for SCR Systems).

The reductant delivery system 135 may also include a reductant dosing passage 186 and a reductant return passage 188. The return passage 188 is shown extending into the reductant tank 148, though in some embodiments of the first power system 100, the return passage 188 may be coupled to a return tube via the reductant header 136. And the reductant delivery system 135 may have—among other things—valves, orifices, sensors, and pumps positioned in the extraction passage 184, reductant dosing passage 186, and return passage 188.

As mentioned above, one example of a reductant is a solution having 32.5% high purity urea and 67.5% deionized water (e.g., DEF), which decomposes as it travels through the decomposition tube 160 to produce ammonia. The ammonia reacts with $NO_x$ in the presence of the SCR catalyst 170, and it reduces the $NO_x$ to less harmful emissions, such as $N_2$ and $H_2O$. The SCR catalyst 170 may be any of various catalysts known in the art. For example, in some embodiments, the SCR catalyst 170 may be a vanadium-based catalyst. But in other embodiments, the SCR catalyst 170 may be a zeolite-based catalyst, such as a Cu-zeolite or a Fe-zeolite. The AOC 174 may be any of various flowthrough catalysts for reacting with ammonia and thereby produce nitrogen. Generally, the AOC 174 is utilized to remove ammonia that has slipped through or exited the SCR catalyst 170. As shown, the AOC 174 and the SCR catalyst 170 may be positioned within the same housing, but in other embodiments, they may be separate from one another.

Figure 2:
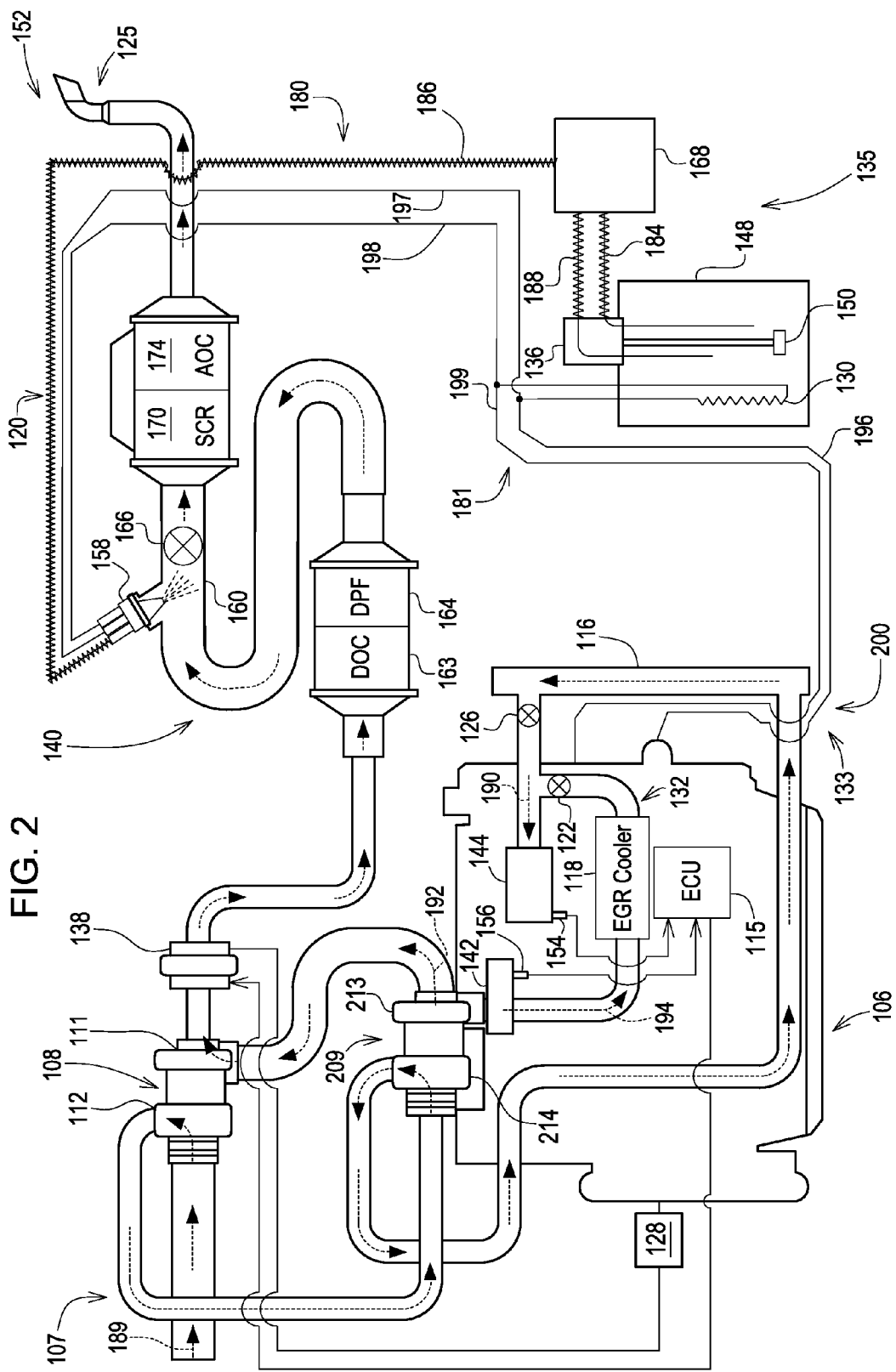
FIG. 2 is a schematic illustration of a second power system having a VG turbocompound turbine.

Next, referring to FIG. 2, there is shown a second power system 200, having a second turbocharger 209 that cooperates with the turbocharger 108. As illustrated, the second power system 200 has many components similar in structure and function as the first power system 100, as indicated by use of identical reference numerals where applicable. The second compressor 214 may be a fixed geometry compressor, a variable geometry compressor, or any other type of compressor capable of receiving fresh intake gas, from upstream of the second compressor 214, and compressing the fresh intake gas to an elevated pressure level before it enters the engine 106. By splitting the compression of the intake gas between the turbocharger 108 and the second turbocharger 209, both can operate at peak efficiency and at slower speeds. This lowers the stress on the components of the turbocharger 108 and the second turbocharger 209 and improves the reliability thereof. Such an arrangement—referred to as series turbocharging—may delivery higher power density, improved low-speed torque, and improve high-altitude operations.

The second turbocharger 209 includes a second turbine 213 coupled to a second compressor 214. The second turbine 213 is positioned downstream of the turbine 111, and the geometry adjustment of the VG turbocompound turbine 138 adjusts the boost level being provided by a combination of the turbocharger 108 and the second turbocharger 209. In this embodiment, the VG turbocompound turbine 138 is positioned downstream of the turbine 111 and downstream of the second turbine 213. As shown, the turbocharger 108 is a fixed geometry turbocharger and the second turbocharger 209 is a second fixed geometry turbocharger, though in other embodiments, the turbocharger 108 and the second turbocharger 209 could be variable geometry turbochargers or wastegate turbochargers, for example.

In a first illustrative operating mode of the second power system 200, the geometry adjustment of the VG turbocompound turbine 138 increases the boost level being provided by the combination of the turbocharger 108 and the second turbocharger 209 to an increased desired boost level for increasing a speed of the turbocharger 108 and the second turbocharger 209 so as to provide an improved transient response thereof. In this mode, the geometry adjustment increases an effective aspect ratio of the VG turbocompound turbine 138. Further, the exhaust gas does not bypass the VG turbocompound turbine 138, resulting in an arrangement that is more efficient across a variety of operating ranges than would otherwise be possible (e.g., wastegate turbocompound).

In a second illustrative operating mode of the second power system 200, the geometry adjustment of the VG turbocompound turbine 138 decreases the boost level provided by the combination of the turbocharger 108 and the second turbocharger 209 to a decreased desired boost level for meeting a decreased demand of the second power system 200. In this mode, the geometry adjustment decreases an effective aspect ratio of the VG turbocompound turbine 138. Additionally, the exhaust gas does not bypass the VG turbocompound turbine 138, resulting in an arrangement that is more efficient across a variety of operating ranges than would otherwise be possible (e.g., wastegate turbocompound).

Figure 3:
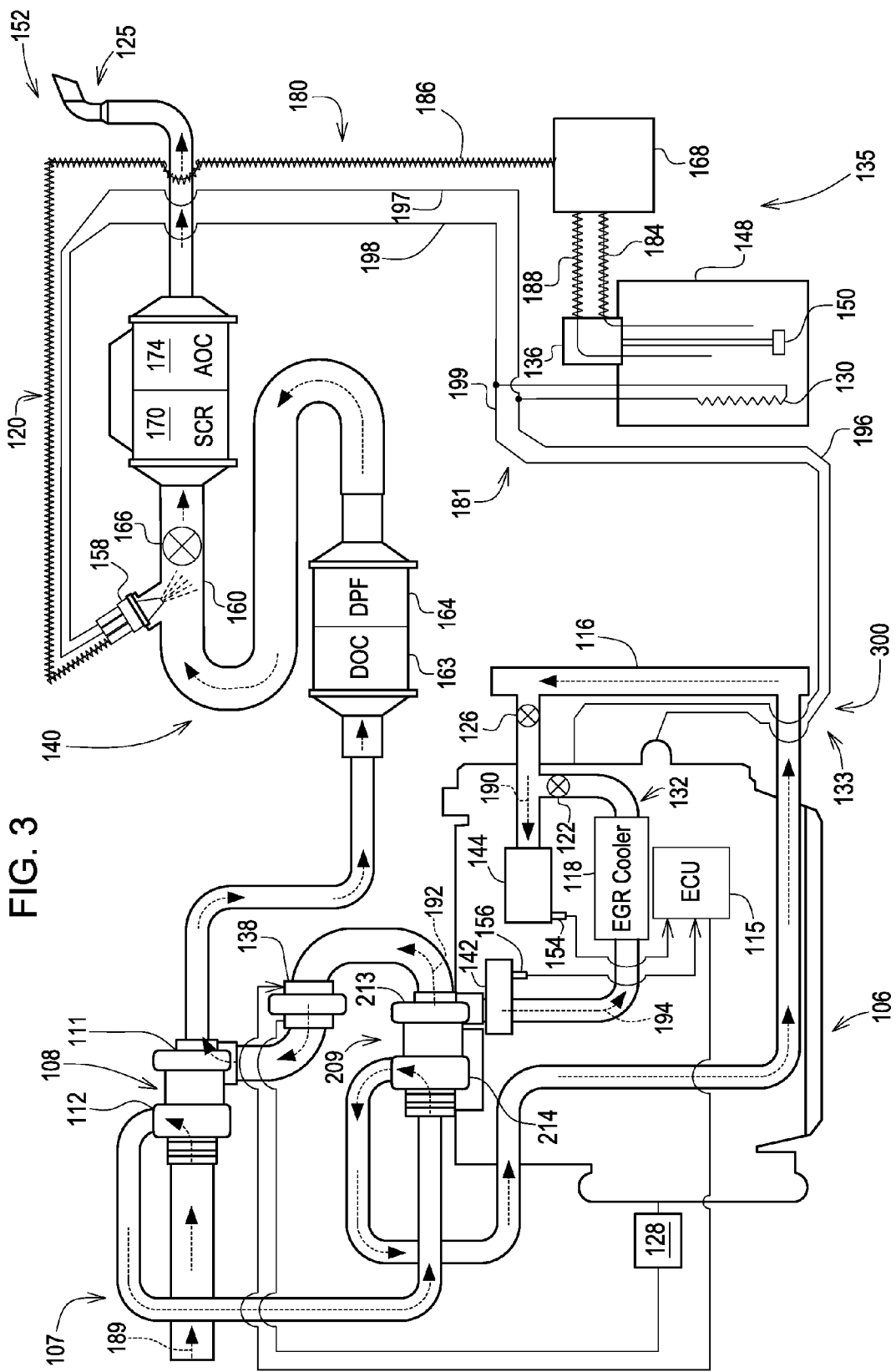
FIG. 3 is a schematic illustration of a third power system having a VGT turbine.

Next, referring to FIG. 3, a third power system 300 is shown, having many components similar in structure and function as the first and second power systems 100, 200, as indicated by use of identical reference numerals where applicable. In this embodiment, the VG turbocompound turbine 138 is positioned downstream of the turbine 111, but upstream of the second turbine 213 relative to the direction of the exhaust gas flowing through the turbine 111 and the VG turbocompound turbine 138.

In a first illustrative operating mode of the third power system 300, the geometry adjustment of the VG turbocompound turbine 138 increases the boost level being provided by the combination of the turbocharger 108 and the second turbocharger 209 to an increased desired boost level for meeting an increased demand of the third power system 300. The geometry adjustment increases the boost level being provided by the combination of the turbocharger 108 and the second turbocharger 209 to an increased desired boost level for increasing a speed of the turbocharger 108 and the second turbocharger 209 so as to provide an improved transient response thereof. In this operating mode, the geometry adjustment increases an effective aspect ratio of the VG turbocompound turbine 138. And in this mode, the exhaust gas does not bypass the VG turbocompound turbine 138, resulting in an arrangement that is more efficient across a variety of operating ranges than would otherwise be possible (e.g., wastegate turbocompound).

In a second illustrative operating mode of the third power system 300, the geometry adjustment of the VG turbocompound turbine 138 decreases the boost level provided by the combination of the turbocharger 108 and the second turbocharger 209 to a decreased desired boost level for meeting a decreased demand of the third power system 300. The geometry adjustment decreases an effective aspect ratio of the VG turbocompound turbine 138, and the exhaust gas does not bypass the VG turbocompound turbine 138. Decreasing the boost level provided by the combination of the turbocharger 108 and the second turbocharger 209 is a method for decreasing the desired boost level for preventing the turbocharger 108 and the second turbocharger 209 from overspeeding.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A power system, comprising:
 a fixed geometry turbocharger comprising a turbine coupled to a compressor;
 a second fixed geometry turbocharger comprising a second turbine coupled to a second compressor;
 a variable geometry (VG) turbocompound turbine positioned downstream of the turbine, but positioned upstream of the second turbine, relative to a direction of a flow of an exhaust gas flowing through the turbine and the second turbine;
 an electrical generator driven by the VG turbocompound turbine; and
 a controller, the controller being configured to send a signal to adjust a geometry of the VG turbocompound turbine so as to adjust a boost level being provided by a combination of the fixed geometry turbocharger and the second fixed geometry turbocharger.

2. The power system of claim 1, wherein the geometry adjustment increases the boost level being provided by the combination of the fixed geometry turbocharger and the second fixed geometry turbocharger to an increased desired boost level for meeting an increased power system demand, the geometry adjustment increases an effective aspect ratio of the VG turbocompound turbine, and the exhaust gas does not bypass the VG turbocompound turbine.

3. The power system of claim 1, wherein the geometry adjustment increases the boost level being provided by the combination of the fixed geometry turbocharger and the second fixed geometry turbocharger to an increased desired boost level for increasing a speed of the fixed geometry turbocharger and the second fixed geometry turbocharger so as to provide an improved transient response thereof, the geometry adjustment increases an effective aspect ratio of the VG turbocompound turbine, and the exhaust gas does not bypass the VG turbocompound turbine.

4. The power system of claim 1, wherein the geometry adjustment decreases the boost level provided by the combination of the fixed geometry turbocharger and the second fixed geometry turbocharger to a decreased desired boost level for meeting a decreased power system demand, the geometry adjustment decreases an effective aspect ratio of the VG turbocompound turbine, and the exhaust gas does not bypass the VG turbocompound turbine.

5. The power system of claim 1, wherein the geometry adjustment increases the boost level being provided by the combination of the fixed geometry turbocharger and the second fixed geometry turbocharger to an increased desired boost level for meeting an increased power system demand.

6. The power system of claim 5, wherein the geometry adjustment increases an effective aspect ratio of the VG turbocompound turbine.

7. The power system of claim 5, wherein the exhaust gas does not bypass the VG turbocompound turbine.

8. The power system of claim 1, wherein the geometry adjustment increases the boost level being provided by the combination of the fixed geometry turbocharger and the second fixed geometry turbocharger to an increased desired boost level for increasing a speed of the fixed geometry turbocharger and the second fixed geometry turbocharger so as to provide an improved transient response thereof.

9. The power system of claim 8, wherein the geometry adjustment increases an effective aspect ratio of the VG turbocompound turbine.

10. The power system of claim 8, wherein the exhaust gas does not bypass the VG turbocompound turbine.

11. The power system of claim 1, wherein the geometry adjustment decreases the boost level provided by the combination of the fixed geometry turbocharger and the second fixed geometry turbocharger to a decreased desired boost level for meeting a decreased power system demand.

12. The power system of claim 11, wherein the geometry adjustment decreases an effective aspect ratio of the VG turbocompound turbine.

13. The power system of claim 11, wherein the exhaust gas does not bypass the VG turbocompound turbine.

14. The power system of claim 1, wherein the geometry adjustment decreases the boost level provided by the combination of the fixed geometry turbocharger and the second fixed geometry turbocharger to a decreased desired boost level for preventing the fixed geometry turbocharger and the second fixed geometry turbocharger from overspeeding.

15. The power system of claim 14, wherein the geometry adjustment decreases an effective aspect ratio of the VG turbocompound turbine.

16. The power system of claim 14, wherein the exhaust gas does not bypass the VG turbocompound turbine.

17. A power system, comprising:
 a fixed geometry turbocharger comprising a turbine coupled to a compressor;
 a second fixed geometry turbocharger comprising a second turbine coupled to a second compressor;
 a variable geometry (VG) turbocompound turbine positioned downstream of the turbine, but positioned upstream of the second turbine, relative to a direction of a flow of an exhaust gas flowing through the turbine and second turbine; and
 a controller configured to send a signal to adjust a geometry of the VG turbocompound turbine so as to adjust a boost level being provided by a combination of the fixed geometry turbocharger and the second fixed geometry turbocharger.

* * * * *